(12) United States Patent
Maslakow et al.

(10) Patent No.: US 10,105,886 B2
(45) Date of Patent: Oct. 23, 2018

(54) THERMOPLASTIC INJECTION MOLDED ELEMENT WITH INTEGRAL THERMOPLASTIC POSITIONING SYSTEM FOR REINFORCED COMPOSITE STRUCTURES

(71) Applicant: Reliant Worldwide Plastics, LLC, Plano, TX (US)

(72) Inventors: William H. Maslakow, Lewisville, TX (US); Rodolfo Diaz, Dallas, TX (US)

(73) Assignee: Reliant Worldwide Plastics, LLC, Plano, TX (US)

( * ) Notice: Subject to any disclaimer, the term of this patent is extended or adjusted under 35 U.S.C. 154(b) by 1175 days.

(21) Appl. No.: 14/048,840

(22) Filed: Oct. 8, 2013

(65) Prior Publication Data

US 2016/0375618 A1 Dec. 29, 2016

Related U.S. Application Data

(60) Provisional application No. 61/711,567, filed on Oct. 9, 2012.

(51) Int. Cl.
*B32B 3/24* (2006.01)
*B29C 45/14* (2006.01)
*B32B 3/26* (2006.01)
*B29C 45/16* (2006.01)
(Continued)

(52) U.S. Cl.
CPC .... *B29C 45/14819* (2013.01); *B29C 45/1671* (2013.01); *B32B 3/266* (2013.01); *B32B 19/02* (2013.01); *B32B 27/06* (2013.01); *B29C 2045/14131* (2013.01); *B32B 2262/106* (2013.01); *Y10T 428/24339* (2015.01); *Y10T 428/24347* (2015.01)

(58) Field of Classification Search
CPC ........... B32B 3/266; B29C 2045/14131; Y10T 428/24339; Y10T 428/24347
USPC ........................................................ 428/139
See application file for complete search history.

(56) References Cited

U.S. PATENT DOCUMENTS

| 2,064,435 | A | 12/1936 | Loeffler |
| 3,323,656 | A | 6/1967 | Weiss et al. |
| 4,159,071 | A | 6/1979 | Roca |

(Continued)

FOREIGN PATENT DOCUMENTS

| CA | 2569596 A1 | 12/2005 |
| CA | 2641166 A1 | 4/2010 |

(Continued)

OTHER PUBLICATIONS

U.S. Appl. No. 14/482,623, Maslakow.

(Continued)

*Primary Examiner* — William P Watkins, III
(74) *Attorney, Agent, or Firm* — Braxton Perrone, PLLC

(57) ABSTRACT

Disclosed embodiments may relate generally to manufactured elements having composite reinforcement, and more specifically to elements comprising a composite precisely positioned within the element for support. Embodiments of such elements typically may be formed using injection molding. Embodiments may further comprise an integral thermoplastic positioning system for positioning the composite, and encapsulating thermoplastic forming the exterior geometry of the element.

17 Claims, 15 Drawing Sheets

(51) Int. Cl.
B32B 19/02 (2006.01)
B32B 27/06 (2006.01)

(56) References Cited

U.S. PATENT DOCUMENTS

| | | | |
|---|---|---|---|
| 4,339,488 A * | 7/1982 | Brokmann | A47C 7/22 160/383 |
| 4,405,669 A | 9/1983 | Pott | |
| 4,837,251 A | 6/1989 | Okey et al. | |
| 4,933,131 A | 6/1990 | Okey et al. | |
| 5,049,342 A | 9/1991 | Scanlon et al. | |
| 5,141,816 A | 8/1992 | Walker et al. | |
| 5,233,743 A | 8/1993 | Robertson et al. | |
| 5,551,755 A | 9/1996 | Lindberg | |
| 5,727,357 A | 3/1998 | Arumugasaamy et al. | |
| 5,769,496 A | 6/1998 | Gryp | |
| 5,871,207 A | 2/1999 | Yoshida | |
| 6,899,363 B2 | 5/2005 | Dry | |
| 6,903,924 B1 | 6/2005 | Tyner | |
| 6,966,533 B1 | 11/2005 | Kalis et al. | |
| 7,005,092 B2 | 2/2006 | Dooley et al. | |
| 7,357,443 B2 | 4/2008 | Wolff et al. | |
| 7,926,879 B2 | 4/2011 | Schmitz et al. | |
| 8,132,861 B2 | 3/2012 | Cone | |
| 8,505,997 B2 | 8/2013 | Hipshier et al. | |
| 8,567,839 B2 | 10/2013 | Kalus et al. | |
| 8,596,206 B2 | 12/2013 | Legeay | |
| 2002/0074688 A1* | 6/2002 | Smith | B29C 45/1657 264/247 |
| 2004/0118853 A1 | 6/2004 | Schaal et al. | |
| 2004/0007791 A1 | 11/2004 | Lenferink et al. | |
| 2005/0140157 A1 | 6/2005 | Emerling | |
| 2005/0201080 A1 | 9/2005 | Seward | |
| 2006/0097544 A1 | 5/2006 | Cowelchuk et al. | |
| 2007/0101671 A1* | 5/2007 | Deeks | B29C 39/10 52/578 |
| 2007/0207292 A1 | 9/2007 | Cowelchuk et al. | |
| 2007/0262632 A1 | 11/2007 | Cody et al. | |
| 2008/0023600 A1 | 1/2008 | Perlman | |
| 2008/0136230 A1 | 6/2008 | Ling | |
| 2008/0277987 A1 | 11/2008 | Deadrick | |
| 2009/0174234 A1 | 7/2009 | Vignal et al. | |
| 2009/0196597 A1 | 8/2009 | Messinger et al. | |
| 2011/0127812 A1 | 6/2011 | DeVoe | |
| 2011/0155854 A1 | 6/2011 | Bakker et al. | |
| 2011/0204683 A1 | 8/2011 | Roy et al. | |
| 2011/0278885 A1 | 11/2011 | Procter et al. | |
| 2011/0316320 A1 | 12/2011 | Kulkarni et al. | |
| 2012/0181839 A1 | 7/2012 | Michalak et al. | |
| 2012/0306241 A1 | 12/2012 | Winter et al. | |
| 2012/0325123 A1 | 12/2012 | Schoerkhuber et al. | |
| 2013/0004696 A1 | 1/2013 | Volgers et al. | |
| 2013/0011623 A1 | 1/2013 | Jones et al. | |
| 2013/0082156 A1 | 4/2013 | Conner | |
| 2013/0119727 A1 | 5/2013 | Lavelle et al. | |
| 2013/0122246 A1 | 5/2013 | Berger et al. | |
| 2013/0169011 A1 | 7/2013 | Evans | |
| 2013/0320742 A1 | 12/2013 | Murolo et al. | |
| 2014/0077531 A1 | 3/2014 | Preisler et al. | |
| 2014/0183238 A1 | 7/2014 | Lin | |
| 2014/0198473 A1 | 7/2014 | Shah et al. | |
| 2014/0261097 A1 | 9/2014 | Eilers et al. | |
| 2015/0068435 A1 | 3/2015 | Maslakow | |
| 2015/0197075 A1 | 7/2015 | Yizze, III et al. | |
| 2015/0314501 A1 | 11/2015 | Maslakow | |
| 2015/0336495 A1 | 11/2015 | Maslakow | |
| 2015/0360784 A1 | 12/2015 | Maslakow | |
| 2017/0073077 A1 | 3/2017 | Maslakow | |

FOREIGN PATENT DOCUMENTS

| | | |
|---|---|---|
| CA | 2641166 A1 | 4/2010 |
| CA | 2258068 C | 3/2012 |
| CH | 362224 A | 5/1962 |
| CH | 362224 A | 5/1962 |
| DE | 3518054 C1 | 1/1987 |
| DE | 102008057220 B4 | 8/2013 |
| EP | 0030522 A2 | 6/1981 |
| EP | 0048055 A2 | 3/1982 |
| EP | 0492129 A1 | 7/1992 |
| EP | 0492129 A1 | 7/1992 |
| EP | 1424424 A1 | 6/2004 |
| EP | 1248674 B1 | 1/2005 |
| EP | 0928804 B1 | 8/2006 |
| EP | 1685009 A1 | 8/2006 |
| EP | 1820394 A1 | 8/2007 |
| EP | 2091721 A1 | 6/2008 |
| EP | 2303537 A1 | 12/2009 |
| EP | 2197670 B1 | 6/2011 |
| EP | 2338768 A1 | 6/2011 |
| EP | 2552679 A1 | 2/2013 |
| EP | 2608493 A1 | 6/2013 |
| EP | 2660048 A1 | 11/2013 |
| JP | S5642950 A | 4/1981 |
| JP | S5642950 A | 4/1981 |
| JP | H06170889 A | 6/1992 |
| JP | H06170889 A | 6/1994 |
| WO | 2005049391 A1 | 6/2005 |
| WO | WO-2005049391 A1 | 6/2005 |
| WO | WO-2013021485 A1 | 2/2013 |
| WO | 2013036848 A1 | 3/2013 |
| WO | WO-2013144351 A1 | 10/2013 |
| WO | 2013187767 A1 | 12/2013 |
| WO | 2013187768 A1 | 12/2013 |
| WO | WO-2014058884 A1 | 4/2014 |
| WO | WO-2015038630 A1 | 3/2015 |

OTHER PUBLICATIONS

Copenheaver, Blaine R.; "International Search Report" prepared for PCT/US2014/054968 dated Dec. 19, 2014, 2 pages.
Mans, Peter; "International Search Report" prepared for PCT/US2013/063887 dated Dec. 20, 2013; 4 pages.
U.S. Appl. No. 14/703,208, Maslakow.
U.S. Appl. No. 14/719,668, Maslakow.
U.S. Appl. No. 14/736,643, Maslakow.
U.S. Appl. No. 14/979,161, Maslakow.
Accessory Power; "TabGRAB Tablet Car Headrest Mount Holder with Reindorced No-Slip Display Design for Samsung Galaxy Tab 3 10.1/Acer Iconia ASUS MeMO Pad FHD 10, VivoTab RT & More 10-inch Tablets"; http://www.amazon.com/gp/product/B005ISU7ZW?ie=UTF8&ref_=de_a_smtd&showDetailTechData=1#technical-data; Nov. 2, 2011; 6 pages.
U.S. Appl. No. 15/178,386, Maslakow.
PCT/US2013/063887, PCT International Search Report, dated Dec. 20, 2013, 4 pages.
PCT/US2013/063887, Written Opinion of the International Searching Authority, 10 pages.
U.S. Appl. No. 15/297,548, Maslakow.
U.S. Appl. No. 15/339,480, Maslakow.

* cited by examiner

THERMOPLASTIC INJECTION MOLDED ELEMENT WITH INTEGRAL THERMOPLASTIC POSITIONING SYSTEM FOR REINFORCED COMPOSITE STRUCTURES

CROSS-REFERENCE TO RELATED APPLICATIONS

This application is related as a non-provisional of and claims benefit under 35 U.S.C. § 119 to U.S. Provisional Patent Application Ser. No. 61/711,567 entitled "Thermoplastic Injection Molded Element with Integral Thermoplastic Positioning System for Reinforced Composite Structures" and filed Oct. 9, 2012, which is assigned to the Assignee of the present application and hereby incorporated by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Structural and non-structural components and assemblies ("elements") are utilized in a variety of applications including, but not limited to, commercial, automotive and aircraft/ aerospace. In many such applications, especially aircraft/ aerospace, it may be useful for the elements to have high strength-to-weight ratios. After all, reducing the weight of the aircraft (while providing the required structural support/ strength) may increase aircraft performance and reduce operating costs (since for example, less weight results in the use of less fuel, which in turn results in less operating costs). In aircraft applications, structural elements may be characterized as primary critical elements (i.e. those which provide a structural foundation or a safety mechanism) or non-critical elements (which provide structural support that are not critical for a structural foundation or a safety mechanism). Critical and non-critical structural elements, for example, are designed to accommodate certain load conditions and boundaries in order for the element to withstand the environment of usage by providing minimum structural support requirements, for instance.

Primary critical and non-critical structural elements utilized throughout a passenger aircraft have typically been manufactured from metal, and more particularly, aluminum alloy or other similar metals due to their inherent high strength-to-weight ratio. Use of such high strength-to-weight ratio metals, however, may be quite costly. For example, fabrication of such metal elements typically might require extensive machining, which may be time and labor intensive. Thus, such metal elements may not be compatible with low-cost, high volume manufacturing methodologies.

More recently, fiber reinforced resin molding has been used as an alternative to metal for forming non-critical elements having high strength-to-weight ratios. For such fiber reinforced resin molded elements (in which reinforcing fibers are dispersed throughout the resin, which is then molded into an element), consistency of strength depends on consistent fiber distribution. Unfortunately, this type of manufacturing process often results in inherent anomalies (which typically might result in weak spots in the element), which may include inconsistent distribution and dispersion of the fibers throughout the resin matrix due to inconsistent flow characteristics of the resin matrix, for example. Anomalies may especially be problematic when the final element is designed to include one or more apertures (which may be located in a structural or mechanical load zone or boundary, for example). The presence of an aperture may alter resin flow during formation, which may result in a knit or meld line (see FIG. 1 for example). Such knit or meld lines may cause significant strength reduction. Additionally, these types of anomalies (and the variations in the processing that typically might result in such anomalies) reduce the consistency/repeatability of manufacturing an element which meets specific structural requirements. This may require more frequent inspection and validation, including destructive mechanical validation, and thus may not be compatible with low-cost, high volume manufacturing methodologies.

If a manufacturing process is consistent and repeatable, on the other hand, and a test specimen meets dimensional and structural or mechanical performance inspection and validation, typical element acceptance might instead occur more efficiently using First Article Inspection procedures. This may aid in meeting low-cost, high volume manufacturing methodologies, for example. Accordingly, Applicants have developed embodiments including alternative manufacturing methods and elements, which may be more compatible with low-cost, high volume manufacturing methodologies.

SUMMARY

Aspects of the disclosure may include embodiments relating to an element comprising: a composite comprising an array of reinforcing fibers (for example, carbon and/or graphite fibers) disposed in a thermoplastic material; an Integral Thermoplastic Positioning System ("ITPS") configured to position the composite within element during formation; and an encapsulating thermoplastic forming an exterior geometry of the element. Embodiments may further include one or more of the following: the composite may comprise an outer surface, with the outer surface of the composite comprising a top surface and a bottom surface, and the ITPS located on and affixed to at least a portion of the top and bottom surfaces of the composite to form a composite-ITPS assembly; the composite-ITPS assembly may provide (at least) minimum required structural support for the element; the encapsulating thermoplastic may be located about and affixed to the composite-ITPS assembly; the ITPS and the encapsulating thermoplastic each may comprise a thermoplastic material, and the composite, ITPS, and encapsulating thermoplastic may each comprise the same thermoplastic material; the thermoplastic material may comprises: polycarbonate, polyphenylene sulfide, polyetherimide, polyetheretherketone (PEEK), self reinforcing polymer (SRP), and combinations thereof; the composite may comprise a plurality of apertures therethrough; the ITPS may comprise a plurality of penetration elements that extend through the apertures in the composite; (the exterior geometry of the element may comprise a final geometric limit and) the ITPS may comprise a plurality of spires extending distally to the final geometric limit of the element (and in some embodiments, the ITPS may further comprise a latticework); the composite-ITPS assembly may be formed by injection molding; the encapsulating thermoplastic may be formed about the composite-ITPS assembly using injection molding; the composite, ITPS, and encapsulating thermoplastic may be affixed via chemical fusing during injection molding; the composite may be multi-layered; the array of reinforcing fibers of the composite may be located in a central plane of the composite, with thermoplastic material located above and below the array of fibers; and/or the array of fibers may be an array of parallel fibers or a multi-directional weave pattern of fibers (for example, a plain weave pattern, a twill weave pattern, or a five harness satin weave pattern).

Additional aspects of the disclosure may relate to embodiments of a method for forming an element comprising one or more of the following steps: providing a composite (typically formed of an array of reinforcing fibers (such as carbon fibers) within a sheath of thermoplastic material); shaping the composite (to provide support for the element); injection molding an ITPS onto the composite to form a composite-ITPS assembly; and injection molding encapsulating thermoplastic onto the composite-ITPS assembly to form the exterior geometry of the element. In some embodiments, injection molding an ITPS onto the composite may comprise placing the composite in a first injection molding tool (configured to form the ITPS about the composite), injecting ITPS material into the first injection molding tool, and removing the composite-ITPS assembly from the first injection molding tool; similarly, in some embodiments injection molding encapsulating thermoplastic onto the composite-ITPS assembly might comprise placing the assembly into a second injection molding tool (configured to form the exterior geometry of the element), injecting encapsulating thermoplastic material into the second injection molding tool, and removing the element from the second injection molding tool. The ITPS in some embodiments may be thermally/homogeneously/chemically bonded or affixed to the composite; similarly, the encapsulating thermoplastic of some embodiments may be thermally/homogeneously/chemically bonded or affixed to the composite-ITPS assembly. The method may also include determining an appropriate location and/or shape for the composite-ITPS assembly (for example, using predictive analysis and/or mold flow analysis). In some embodiments, the ITPS might comprise a plurality of spires projecting outward to the final geometric limit of the element (defining the exterior geometry of the element at that location), and the ITPS spires may be operable to retain the composite in location (for example, in the second injection molding tool) during formation of the encapsulating thermoplastic. Typically, the composite-ITPS assembly may provide minimum structural support required for the element. Some method embodiments may further include providing a second composite, orienting the second composite with respect to the first composite (for example, so that the reinforcing fibers are not aligned or parallel), and/or affixing/joining the second composite and the first composite (for example, to form a multi-layered composite). Some embodiments with two or more composites may further comprise positioning a spacer between the first composite and the second composite prior to joining the composites into an integral whole.

Persons of skill will understand these and other aspects and embodiments and features based on the following detailed description and the drawing figures, all of which are intended to be included within the scope of this disclosure.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
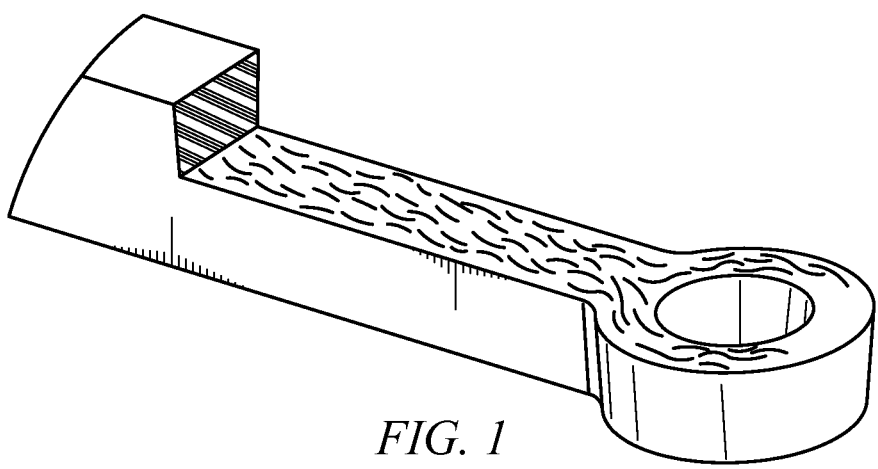
FIG. 1 is a partial cross-sectional view of a perspective figure illustrating an exemplary undesirable fiber reinforcement distribution and dispersion about a formed aperture, resulting in a weak spot.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

According to disclosed embodiments, an element might comprise a composite, an integral thermoplastic positioning system, and an encapsulating thermoplastic. Such an element (such as a structural or non-structural component and/or assembly of components) may be formed using the composite as an internal support structure, and locating the composite within the element using an integral thermoplastic positioning system ("ITPS"). For example, the ITPS may hold the composite material in position within the encapsulating thermoplastic, for instance during injection molding of the encapsulating thermoplastic to form the exterior of the element. In addition to positioning the composite within the element, the ITPS may also provide some structural support, such that the assembly of the composite and the ITPS typically may provide the minimum structural support requirements of the element. The assembly of the composite and the ITPS typically may be located within encapsulating thermoplastic, forming the outer geometry of the element. The composite, ITPS, and encapsulating thermoplastic preferably would all be joined or affixed to form an integral element, and typically they might all comprise the same thermoplastic material, allowing for chemical bonding of these features into an integrated whole. Typically, injection molding may be used to form the ITPS on the composite, and to form the encapsulating thermoplastic on the assembly of the composite and the ITPS.

The composite material typically may comprise an array of reinforcing fibers (for example, carbon and/or graphite fibers and/or glass and/or aramid, perhaps typically with carbon microscopic crystals aligned parallel to the longitudinal axis of the carbon fibers, for example) aligned in a precise orientation, and a thermoplastic material (for example, a sheathing) located about the array of reinforcing fibers (for example, encapsulating the reinforcing fibers). The array of fibers may be a weave pattern (for example, a plain, twill, or harness satin weave) in some embodiments, while in other embodiments the array of fibers may be aligned uni-directionally in a parallel linear pattern. The composite typically might be provided in pre-defined and/or pre-formed solid three dimensional geometries, such as a sheet, which can then be shaped according to the needs of the specific element (for example, by heat forming and/or cutting). Typically, the array of fibers of the composite material would be located near the center (thickness) of the composite sheet material (e.g. in a central plane), with thermoplastic material located atop and beneath the array of fibers. In some alternative embodiments, the composite might initially be a blank formed of thermoplastic resin with reinforcing fibers dispersed throughout (for example, approximately uniformly). For example, such an alternative composite might be injection molded into a blank form (for example a sheet), using resin impregnated with reinforcing fibers. Regardless, the composite typically might provide approximately consistent fiber distribution (and perhaps orientation in some embodiments) throughout the element, so that it can provide precise and consistent/reproducible structural and/or mechanical support. The composite typically may be located within the element to provide structural support for the element. The composite may comprise an outer surface, with the ITPS located on and affixed to at least a portion of the outer surface of the composite. For example, the composite may comprise a top surface and a bottom surface, and the ITPS may be located on and attached to at least a portion of the top and/or bottom surfaces of the composite. The ITPS typically might comprise a thermoplastic material that is the same (chemical composition) as that of the composite (and in some embodiments, the ITPS may also be reinforced with suitable fibers, for example carbon and/or graphite and/or glass and/or aramid fibers dispersed within the thermoplastic resin material during injection molding of the ITPS onto the composite). The ITPS may then be thermally and/or homogeneously affixed (connected) to the composite, for example by chemical bonding (of the sort that might occur by injection molding the ITPS onto the composite, for example).

Typically, the ITPS comprises a plurality of spires (or projections). The spires generally might extend outward (distally) from the outer surface of the composite, with the distal ends of each spire extending to the final geometric limit of the element (for example, defining the exterior geometry of the element at that specific location). Typically, the spires might extend or project distally from the top and bottom surfaces (of the composite and/or the assembly of the composite and any non-spire portion of the ITPS), and often they may also extend from the side surfaces as well. The spires may operate to precisely locate and maintain the three dimensional position of the composite in an injection molding tool, for example during formation of an encapsulating thermoplastic. Thus, typically one or more spire may extend from each side of the composite (so that the composite can be firmly and securely held in place in three dimensions during formation of the encapsulating thermoplastic which defines the exterior geometry of the element). In some embodiments, the spires narrow as they extend distally outward.

In some embodiments, the ITPS may further comprise a latticework or grid structure on the top and bottom surfaces of the composite. The latticework may comprise a series of linear or longitudinal structures with a plurality of crossbars linking adjacent linear or longitudinal structures. And in some embodiments in which the composite has a plurality of apertures therethrough (passing from the top surface to the bottom surface, for example), the ITPS may further comprise a plurality of penetration elements that extend through the apertures in the composite (which may provide mechanical interference locking of the ITPS to the composite (in addition to, or in some instances perhaps instead of, the typical chemical bonding/fusing) and join/connect the top latticework to the bottom latticework). The spires of the ITPS may be aligned with the apertures in the composite in some embodiments (so for example, the penetration elements may link the spires on the top surface with the spires on the bottom surface). Typically, the spires extend outward distally from the latticework. In some embodiment, however, it is possible that there might be no spires (on at least a portion of the latticework), and that the latticework itself might extend outward to the final geometric limit of the element.

The composite and the ITPS typically may be securely affixed to form a unified composite-ITPS assembly (typically by injection molding the ITPS onto the composite, and typically forming a chemical bond (for example, with homogeneous connections) due to use of the same thermoplastic material within the composite and the ITPS). The composite-ITPS assembly typically may provide the minimum required structural support for the element (for example, based on location and structural/mechanical support of the assembly). In other words, since the assembly of the composite and the ITPS provides the necessary structural support for the entire element, the remaining portions of the element (for example the encapsulating thermoplastic) may not be required to provide any structural support for the element. The composite-ITPS assembly typically may be formed via injection molding, and injection molding of the same (chemical composition) thermoplastic material may result in a unified assembly structure.

The encapsulating thermoplastic typically might be located about and affixed to the composite and/or the ITPS (for example to the composite-ITPS assembly). The encapsulating thermoplastic typically might comprise a thermoplastic material that is the same (chemical composition) as that of the ITPS and/or the composite (and may be either unreinforced or reinforced with suitable fibers such as carbon or graphite fibers, depending on the embodiment). In typical embodiments, the encapsulating thermoplastic may be formed about the composite-ITPS assembly using injection molding. By using the same thermoplastic material throughout the element, the composite, ITPS, and encapsulating thermoplastic may be chemically bonded (for example, with homogeneous connections) to form the element as a unitary whole (especially when used in conjunction with (thermal) injection molding processes). The encapsulating thermoplastic typically may form the exterior geometry of the element. Since the composite-ITPS assembly may provide the required structural support for the element in some embodiments, the encapsulating thermoplastic does not have to provide substantial (or perhaps even any) support. This may allow for selection of less costly encapsulating thermoplastic, for example without the need to add reinforcing fibers. In some embodiments, the encapsulating thermoplastic may, however, provide resistance to flammability, smoke and/or toxicity (for example, per FAR 25.853) and/or affect heat release (for example, per OSU 55/55).

In some embodiment, the composite of the element may be multi-layered (for example, formed of two or more layers or plies of composite joined together, with each layer/ply typically having reinforcing fibers located within thermoplastic sheathing (having an upper thermoplastic surface above the reinforcing fibers and a lower thermoplastic surface below the reinforcing fibers) and the adjacent thermoplastic surfaces of the stacked layers/plies of composite fused or joined together to form a single, integrated composite element). This layering of composites may provide for additional structural support for the element. While some embodiments may require multi-layered composite support throughout the element, in other embodiments a single layer of composite may be used for most of the element, with additional layer(s) used only in critical areas of the element requiring greater structural support (for example, around an aperture). So, the number of layers of composite, orientation of the layers, and/or amount of the element supported by each layer may vary, depending on the specific needs of the particular element. Typically, the multiple layers of composite may be securely affixed (for example, fused together, as by ultrasonic welding, thermal staking, thermal welding, thermal consolidation, thermal vacuum lamination, or other such joining means). And in some embodiments, the multiple layers of composite may be oriented so that the reinforcing fibers are not aligned (e.g. so that the fibers of one layer are not parallel with those of a second layer). By altering the fiber orientation of the layers, the joint composite may provide additional strength in more than one direction.

Optionally, the multi-layered composite in some embodiments may include a spacer located between a portion of two layers of composite. The spacer may allow the joint (e.g. multi-layered) composite to be formed in more complex shapes, providing its support where needed for a specific element. The spacer may comprise one or more projections, typically aligned with the adjacent corresponding spires on the composite-ITPS assembly (so that the projections may provide support for the spires, ensuring that there may be minimal deflection of the spires of the sort that might affect positioning of the composite within the encapsulating thermoplastic). Typically, the spacer(s) might comprise thermoplastic material. More specifically, the spacer(s) may be formed of the same thermoplastic material as used in the composite, so that they may be affixed by chemical and/or thermal bonding, for example, and so that the element may have uniform thermoplastic material throughout. While the above description describes embodiments generally, the following figures may assist in an understanding of various embodiments.

Figure 2:
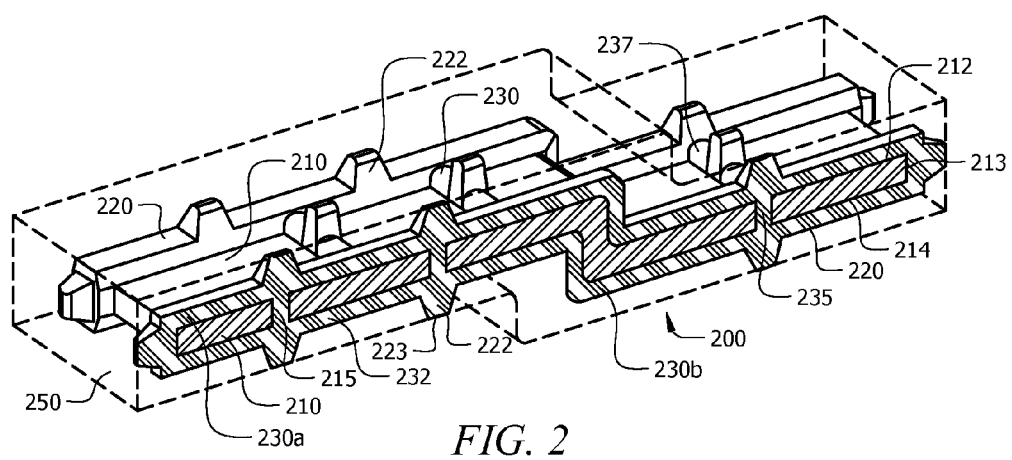
FIG. 2 is a perspective cross-sectional view of an exemplary injection molded thermoplastic element with a single layer composite, an ITPS, and an encapsulating thermoplastic.
Figure 2A:
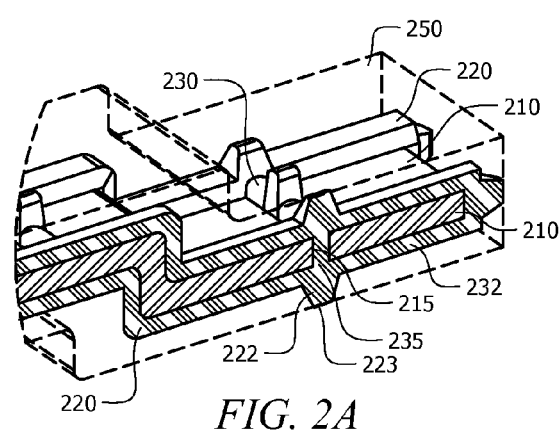
FIG. 2A is an enlarged cross-section view of the injection molded thermoplastic element of FIG. 2.
Figure 2B:
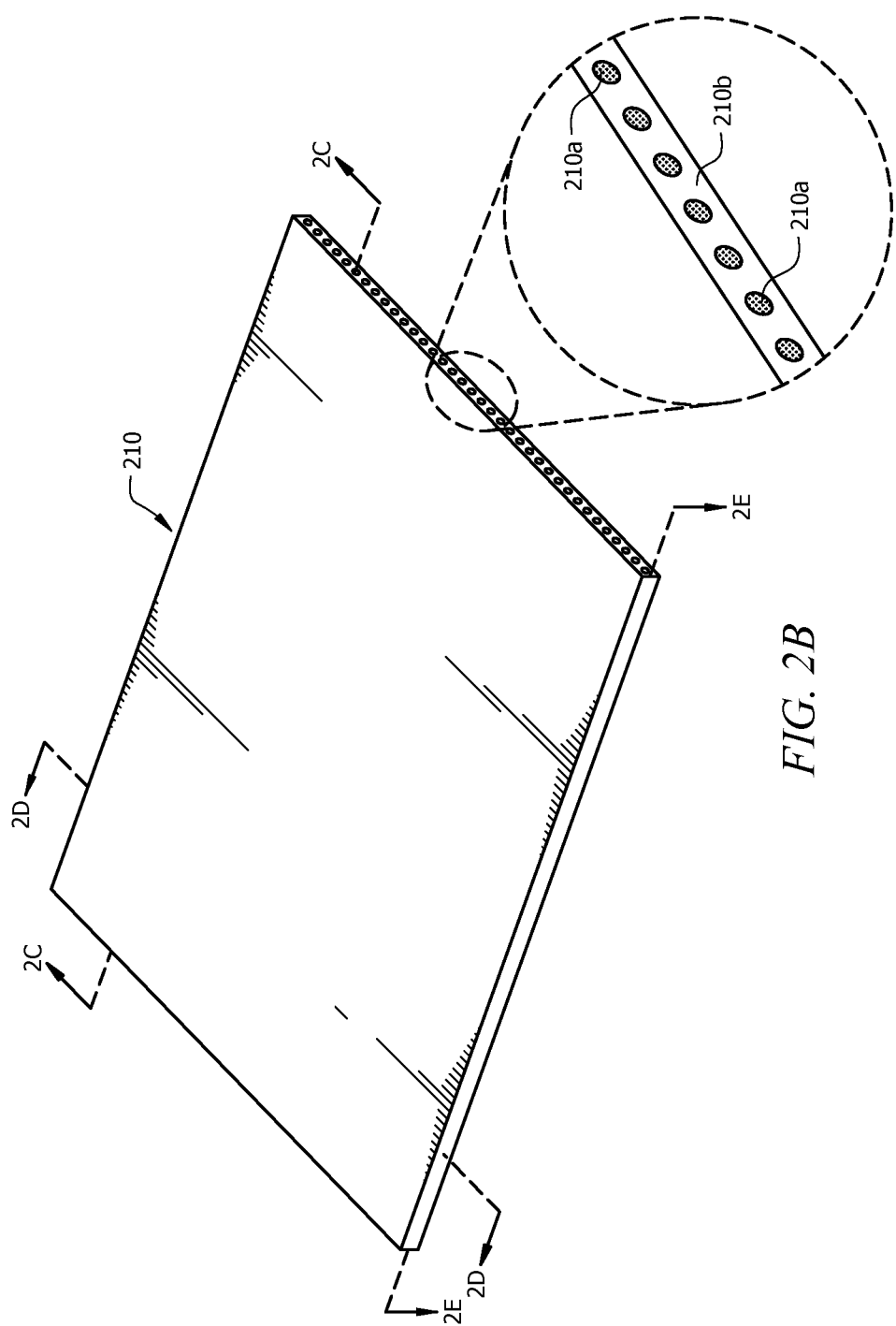
FIG. 2B is a perspective view of an exemplary composite material blank (prior to shaping for use in an element, for example) having a parallel array of (e.g. unidirectional) reinforcing fibers.
Figure 2C:
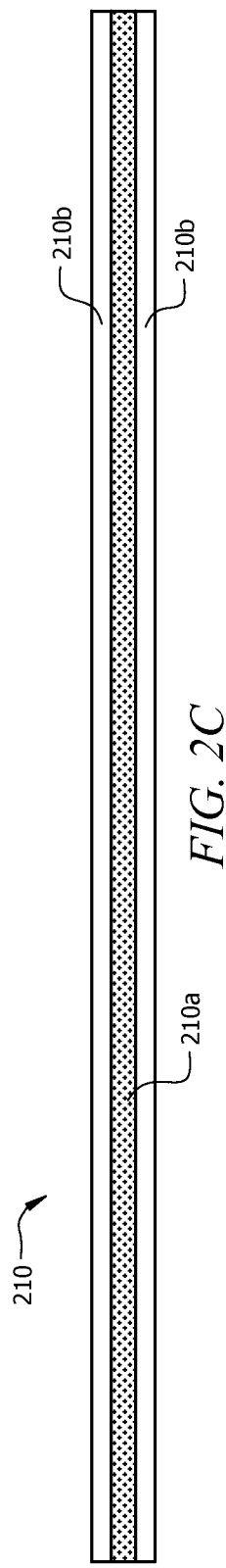
FIGS. 2C-E illustrate various cross-sectional views of FIG. 2B.
Figure 2D:
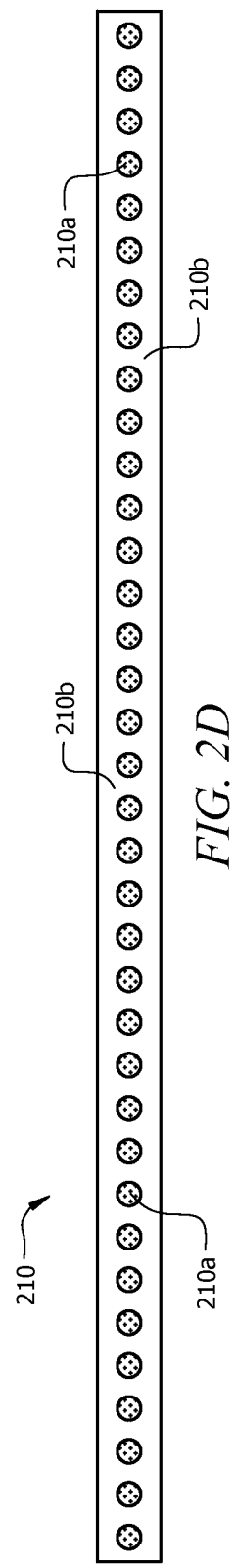
Figure 2E:
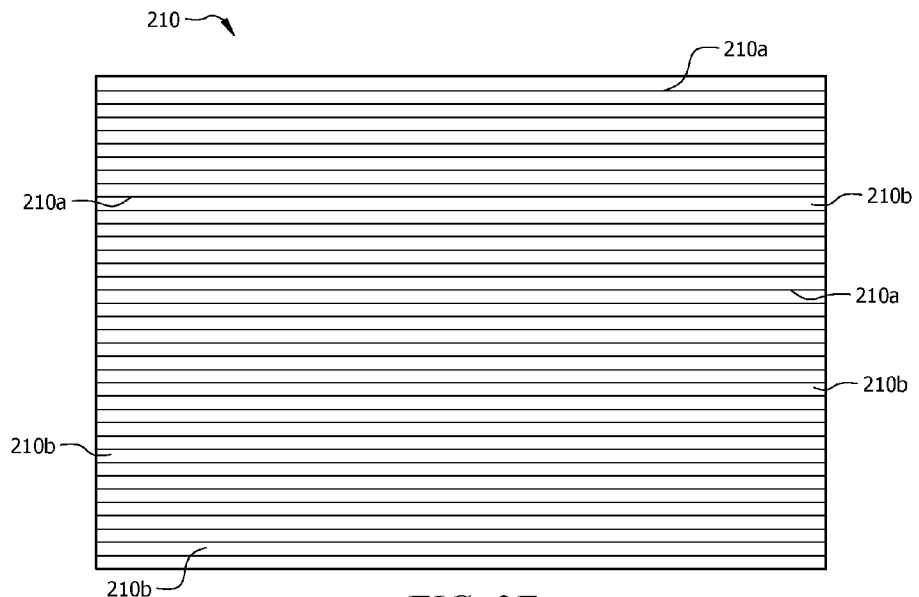

The embodiment of FIG. 2 illustrates a cross-sectional perspective view of an exemplary element 200. The element 200 comprises a composite 210, an ITPS 220, and an encapsulating thermoplastic 250. The composite 210 typically may be formed from a three-dimensional geometric blank (such as a sheet, for example) of fiber reinforced material (typically with an array of fibers disposed in a thermoplastic material) and may be shaped as needed to provide structural support for the element 200. Thus, the composite 210 typically would be pre-formed into a predefined three dimensional shape based on the structural support needs of the specific element 200. For example, the composite 210 may be shaped using thermoforming, compression forming, and/or thermolamination. The ITPS 220 is affixed to the composite 210, and positions the composite 210 to provide structural support for the element 200 (within the encapsulating thermoplastic, for example). The ITPS 220 of FIG. 2 may comprise a latticework (or grid) 230 having a plurality of spires or projections 222 extending outward distally (although in some embodiments, the ITPS may comprise a plurality of spires without any latticework). More specifically, the ITPS 220 of FIG. 2 comprises an upper portion 230*a* and a lower portion 230*b*, typically joined together to form an integrated whole latticework 230, and a plurality of spires 222 extends outward distally from the latticework 230. Typically, the plurality of spires 222 extend outward from at least the top 212 and bottom 214 surfaces (of the composite and/or latticework), with a plurality of spires 222 projecting outward from each surface. In the embodiment of FIG. 2, spires 222 also project outward from the side ends 213. The spires 222 of FIG. 2 may operate to locate/position and hold the composite 210 in position within the element 200, for example during injection molding of the encapsulating thermoplastic about the assembly of the composite and the ITPS, and typically may fix the position of the composite in three dimensions. So in the embodiment of FIG. 2, a plurality of spires 222 typically may extend from the top and bottom and each side of the element.

In FIG. 2, the latticework 230 of the ITPS 220 comprises longitudinal structures 232 and crossbar structures 237 (and while these features are shown in FIG. 2 as being perpendicular in configuration, other configurations may operate in alternative embodiments). Persons of skill may appreciate that FIG. 2 merely illustrates an exemplary latticework, and that latticework embodiments may have a variety of shapes (typically so long as it may provide secure positioning of the ITPS on the composite). For example, the ITPS in some embodiments might be a sheathing that enclosed the majority of the composite outer surface (although typically at least a portion of the outer surface of the composite may be uncovered by the ITPS to aid in formation of the ITPS on or about the composite using injection molding, for example allowing the composite to be held in position in the injection molding tool for formation of the ITPS). The composite 210 of FIG. 2 has a plurality of apertures 215 penetrating its thickness from the top surface 212 to the bottom surface 214 (typically formed using a blade, abrasive jet, or other such means to penetrate the composite blank sheet), and the ITPS of FIG. 2 also includes penetration elements 235 through the apertures 215 in the composite (with the plurality of penetration elements corresponding to the plurality of apertures). The interaction of the apertures 215 and the penetration elements 235 may provide mechanical interference locking to further integrate the ITPS 220 and the composite 210 into an integral whole (i.e. a unified assembly). Additionally, the apertures 215 may aid in flow of thermoplastic resin material during injection molding (for example, if the ITPS is injected molded onto the composite). In the embodiment of FIG. 2, the apertures 215 in the composite and the penetration elements 235 may be aligned with corresponding spires 222 on the top and bottom surfaces (at least for some spires). The plurality of spires 222 may project/extend outward distally from the longitudinal structures 232, the crossbar structures 237, or both (as shown in FIG. 2).

The spires 222 and/or latticework 230 typically may be located as needed for the specific element 200, for example to provide positioning of the composite 210 and in some instances to provide additional structural support for the element 200 (with the composite-ITPS assembly 210, 220 providing at least the required minimum structural support for the element 200). In the embodiment of FIG. 2, the spires 222 narrow as they project/extend outward distally (such that the distal end 223 is narrower than the base of the spires (at the point of attachment to the latticework or composite), and the spires may have a pyramidal shape). While the distal narrowing of spires may be optional in some embodiments, it may be beneficial in some contexts. For example, the distal narrowing shape might aid in injection molding by allowing drafting of the sides of the spires, to simplify removal of the ITPS spires from the ITPS injection molding tool. The shape might also provide for minimal surface contact between the distal end of the spires and the inner surface of the cavity of the injection molding tool for formation of the encapsulating thermoplastic, which may allow the resin of the encapsulating thermoplastic to meld effectively with the distal ends of the spires, fusing over to minimize or eliminate potential pathways for moisture and/or crack propagation for example (so that the outer surface of the element might present a smooth, continuous surface). The distal end 223 of each spire 222 of FIG. 2 typically extends to the final geometric limit of the element 200 (for example, defining the exterior geometry of the element 200 at that specific location, such that the distal end 223 of each spire typically may be located at or in proximity to the exterior surface of the element 200). This allows the spires 222 to precisely locate, position, and or hold/maintain the composite 210 as needed within the element 200 to provide structural support (and to allow the formation process to be precisely repeatable). More specifically, the spires 222 operate with the injection molding tool for formation of the encapsulating thermoplastic 250 (that will define the exterior of the element 200) to precisely position the composite within the injection molding tool (for example, with the distal end of the spires extending to fit snuggly within the cavity of the injection molding tool for formation of the encapsulating thermoplastic).

The encapsulating thermoplastic 250 is located about the composite and the ITPS (typically the composite-ITPS assembly 210, 220) and affixed thereto. The encapsulating thermoplastic 250 typically forms the exterior geometry of the element 200, surrounding and/or encasing the composite-ITPS assembly (or at least portions of the assembly). Since the composite-ITPS assembly 210, 220 meets minimum requirements for the element's structural support, the encapsulating thermoplastic need not provide any (or at least minimal) structural support. This may allow for selection and use of a less costly material for the encapsulating thermoplastic 250 (for example, using encapsulating thermoplastic material without any or with less fiber reinforcement). The encapsulating thermoplastic 250 may, however, provide surface characteristics for the element (for touch and feel, for example), and may provide resistance to flammability, smoke, and/or toxicity emissions (as per FAR 25.853, for example) and/or heat release requirements (as per OSU 55/55, for example).

Typically, the ITPS 220 of FIG. 2 may be injection molded onto the composite 210 (for example, by inserting the shaped composite into an injection molding tool shaped to form the exterior geometry of the ITPS), and/or the encapsulating thermoplastic 250 may be injection molded onto the composite 210 and/or ITPS 220 (for example, by inserting the assembly of the composite and the ITPS into an injection molding tool shaped to form the exterior geometry of the element). In FIG. 2, the ITPS 220 is securely affixed to the composite 210, and the encapsulating thermoplastic 250 is securely affixed to the composite 210, the ITPS 220, or both (i.e. the assembly). Typically, the composite 210 of FIG. 2 may include a thermoplastic material (typically with an array of carbon and/or graphite fibers (or other suitable reinforcing fibers, such as continuous glass and/or aramid such as Kevlar™) disposed therein, providing compressive strength and tensile strength, and stiffness, in one or more directions), the ITPS 220 of FIG. 2 includes a thermoplastic material (typically but optionally also including a plurality of reinforcing fibers, such as carbon and/or graphite (or other suitable reinforcing fibers such as glass and/or aramid such as Kevlar™), dispersed throughout its thermoplastic material (typically approximately uniformly)), and the encapsulating thermoplastic 250 includes a thermoplastic material (which may or may not include any reinforcing fibers, such as carbon and/or graphite and/or any other suitable reinforcing fibers disposed throughout its thermoplastic material). In some embodiments, reinforcing fibers within such thermoplastic injection molded resins (as used to form ITPS for example) might have a length aspect ratio of about 50-200:1 (length to fiber diameter). Typically, the composite might comprise up to about 70% by weight or volume reinforcing fibers, or in other embodiments about 60% by weight reinforcing fibers (with resin content of approximately 40% by weight). Typically, the ITPS might comprise about 20-60% by weight or volume reinforcing fibers, or in some embodiments about 30-50% by weight or volume reinforcing fibers, or about 30% by weight or volume of reinforcing fiber to resin.

In the embodiment of FIG. 2, the thermoplastic material of the composite 210, the ITPS 220, and the encapsulating thermoplastic 250 typically may be the same thermoplastic material (i.e. having the same chemical composition). While any semi-crystalline or amorphous thermoplastic might be used, the common thermoplastic material might, for example, comprise polycarbonate, polyphenylene sulfide, polyetherimide, polyetheretherketone (PEEK), and/or self reinforcing polymer (SRP) (or other suitable thermoplastic materials) in some embodiments. By using the same thermoplastic material throughout the element 200 (especially when injection molding processing is used for formation), thermal, homogeneous, and/or chemical attachment (bonding) may occur, securely affixing the composite, the ITPS, and the encapsulating thermoplastic of FIG. 2 into an integrated whole. In other words, use of the same chemical composition of thermoplastic material may provide chemical fusing during thermal injection molding to form a unitary/unified structure throughout the desired element (typically with a homogeneous connective interface between the features and resulting in secure attachment, connection, and/or joining of the composite, the ITPS, and the encapsulating thermoplastic).

Figure 2F:
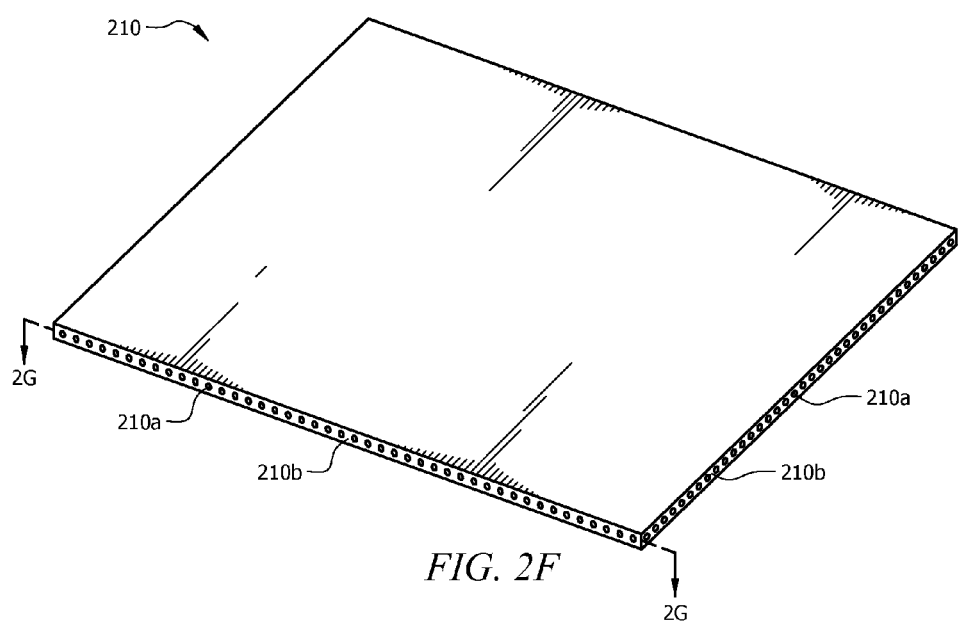
FIG. 2F is a perspective view of an exemplary composite material blank (prior to shaping for use in an element, for example) having a multi-directional array of reinforcing fibers.
Figure 2G:
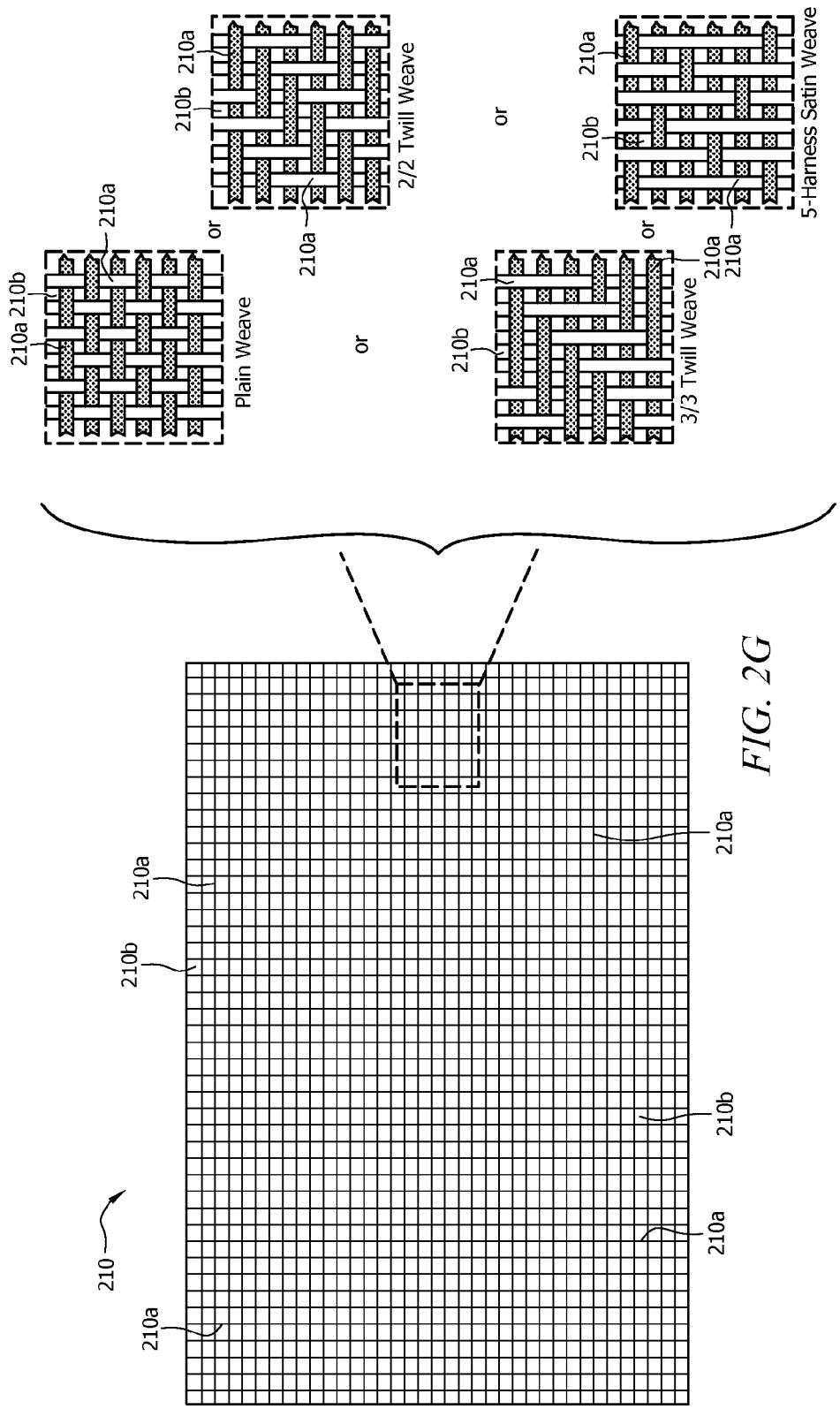
FIG. 2G is a cross-sectional view of FIG. 2F, illustrating alternative exemplary multi-directional weave patterns for reinforcing fibers.

The composite of FIG. 2 may comprise an array of reinforcing fibers 210a (such as carbon and/or graphite and/or continuous glass, for example) disposed (for example encapsulated) in a suitable thermoplastic material resin (sheath) 210b (such as polycarbonate, polyphenylene sulfide, polyetherimide, polyetheretherketone (PEEK), and/or self reinforcing polymer (SRP)). The array of reinforcing fibers 210a in some embodiments may align the fibers in a precise unidirectional orientation (for example parallel, as shown in FIGS. 2B-E). In other embodiments, however, the array of reinforcing fibers 210a might orient the fibers in some other specific, fixed orientation, perhaps even an orientation that is not unidirectional; for example, in some alternative embodiments the fibers of the composite might have a bi-directional or otherwise multi-directional orientation. FIGS. 2F-G illustrate an exemplary composite blank sheet embodiment in which reinforcing fibers 210a are oriented in a multi-directional weave pattern within a thermoplastic sheath 210b. Exemplary weave patterns might include plain weave, twill weave, and/or harness satin weave (for example, 5-harness satin weave). Typically, the array of fibers in the embodiment of FIG. 2 (which is a single ply composite) would be planar, with the remainder of the thickness of the composite generally being formed by the thermoplastic material. In other words, the fibers of the composite of FIG. 2 typically would not be uniformly dispersed or distributed throughout the thermoplastic resin, but instead might lie in a central plane located within the thermoplastic material. The composite typically may be pre-formed as a blank (for example, a sheet). Thus, the composite of FIG. 2 is typically in solid form (for example, provided by a manufacturer) prior to shaping, formation of apertures, formation of ITPS, and/or formation of encapsulating thermoplastic. An embodiment of the composite might comprise a unidirectional or multi-directional continuous fiber reinforced thermoplastic tape, typically having continuous carbon fiber reinforcement encapsulated within PPS Polyphenylene sulfide, for example. The composite might have a thickness of about 0.007 Nom Thick in some embodiments. An exemplary composite embodiment might be Celstran CRF-TP™ as provided by Ticona Engineering Polymers, or composite from TenCate.

Due to joinder of separate features (such as the composite, the ITPS, and the encapsulating thermoplastic, each having different properties) into an element, the make-up of the element of FIG. 2 may vary somewhat throughout its thickness, for example. More specifically, the amount and/or orientation (and/or type) of reinforcing fiber may vary throughout the element (corresponding to the different features). The composite of FIG. 2 typically may provide fibers only in a core region, surrounded by thermoplastic material without any fibers. In the core region of the composite, the fibers may be oriented precisely (for example in the same direction unilaterally and/or parallel), even around apertures. In the ITPS of FIG. 2, the thermoplastic material may have reinforcing fibers disposed throughout (typically by injection molding thermoplastic resin with fibers onto a composite), and the orientation of the fibers may vary based on the injection molding process. In the encapsulating thermoplastic of FIG. 2, there may be no reinforcing fibers at all, or in some embodiments there may be less reinforcing fibers or different reinforcing fibers. So a cross-section of an element may be stratified, with fiber variation resulting from joinder of multiple features into an integrated, unified whole. This type of stratification may also occur in other dimensions (for example, based on the shape of the ITPS). The dimensions of the ITPS (for example, thickness), may vary depending on the specific needs of the element. For example, the spires may vary in number and size (length and/or width/diameter) based on the external geometry of the element and/or the structural support needs of the element. The latticework (if any) may also vary in size (for example thickness and/or number of longitudinal and/or crossbar structures) based for example on the structural support needs of the specific element. Each element will have minimum structural support requirements (which may include structural and/or mechanical requirements) based on its intended usage, and typically the composite-ITPS assembly of FIG. 2 may meet these minimum requirements.

Figure 3:
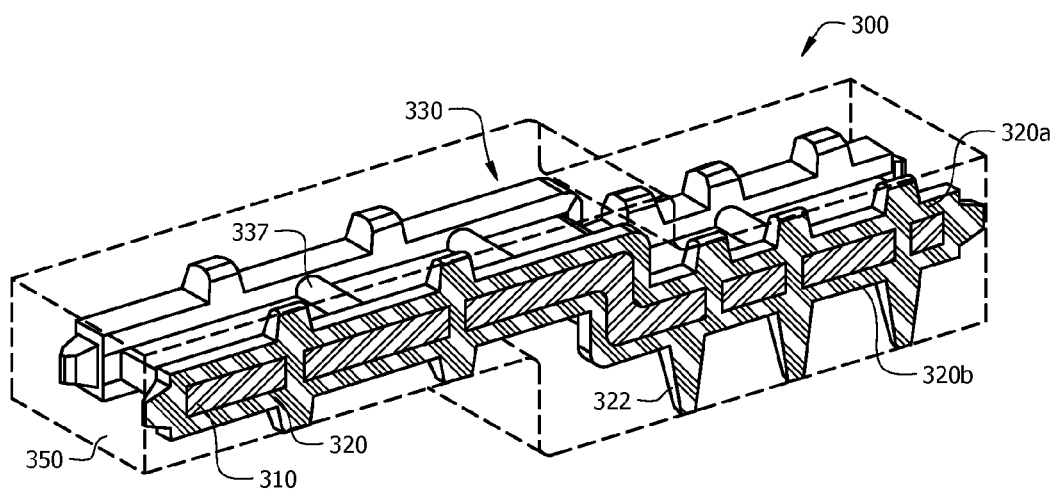
FIG. 3 is a perspective cross-sectional view of an exemplary injection molded thermoplastic element with a single layer composite, positioned at least partially off neutral axis of the element.
Figure 3A:
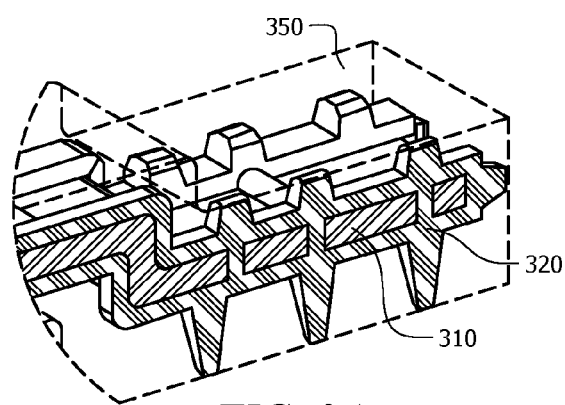
FIG. 3A is an enlarged cross-sectional view of the injection molded thermoplastic element of FIG. 3.

FIG. 3 illustrates a cross-sectional view of another exemplary embodiment of an element 300. This embodiment closely resembles that of FIG. 2 in many respects (for example, having a composite 310, an ITPS 320, and an encapsulating thermoplastic 350), but demonstrates that location of the composite 320 may not be along the neutral axis (of the element) in some embodiments, and that the upper portion 320a and lower portion 320b of the ITPS may not be mirror images in some embodiments. While FIG. 2 illustrates upper and lower portions of the ITPS as mirror images (symmetrical) about the composite and/or the ITPS positioning the composite along the centerline (or for example, the neutral axis) of the element, FIG. 3 illustrates an alternative embodiment in which the spires 322 on at least a portion of the lower portion 320b of the ITPS are longer (extend farther distally outward) than the spires 322 on the upper portion 320a of the IPTS. Thus, the composite 320 is not located along the centerline (or neutral axis) of at least a portion of the element 300. FIG. 3 demonstrates that the ITPS 320 may position the composite 310 anywhere within the element, based on the extension of the spires (which may operate with the injection molding tool for formation of the encapsulating thermoplastic 350 to position the composite 310 as desired within the element 300 to provide structural support). FIG. 3 also demonstrates that the spires 320 may be located on the longitudinal structures 330 of the latticework but not on the crossbar structures 337. Persons of skill may appreciate that the spires 320 may be located on any portion of the latticework 330 as needed for positioning of the composite 310 and/or providing additional support to the element (or in some embodiments, perhaps the spires 320 might even be directly affixed to the composite, with no latticework).

Figure 4:
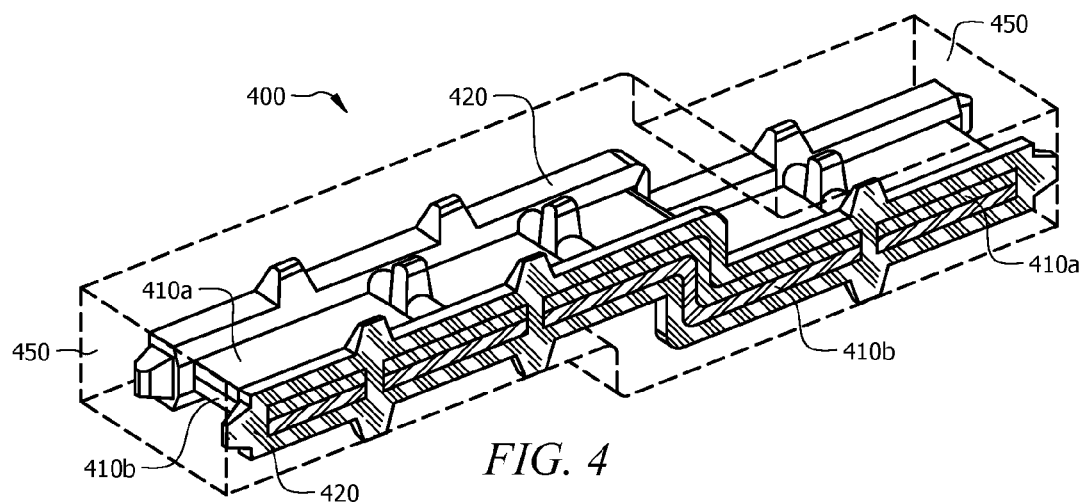
FIG. 4 is a perspective cross-sectional view of an exemplary injection molded thermoplastic element with a multi-layer composite.
Figure 4A:
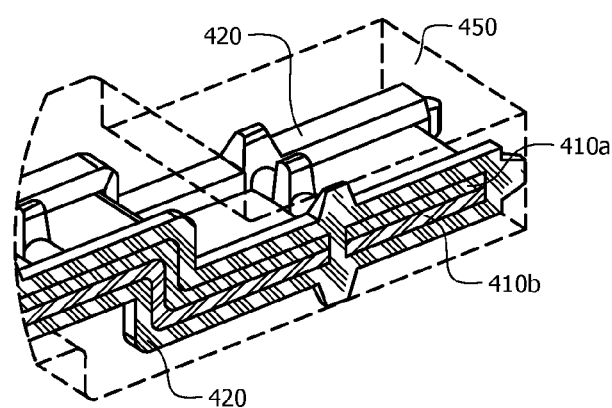
FIG. 4A is an enlarged cross-sectional view of the injection molded thermoplastic element of FIG. 4.

FIG. 4 illustrates a cross-sectional view of another embodiment of an exemplary element 400. FIG. 4 is similar in many respects to the embodiment shown in FIG. 2, except the composite is multi-layered, comprising two composite layers/plies 410a and 410b. The two composite layers 410a and 410b are affixed and joined into an integral, unified composite having greater thickness than provided by a single layer of composite. For example, the two composite layers 410a and 410b may be joined or affixed by ultrasonic welding, thermal staking, thermal welding, thermal consolidation, thermal vacuum lamination, or other means suitable to securely (and homogenously) attach the layers. The use of multi-layered composite may allow the composite to provide greater structural support to the element 400. In some embodiment, the multiple layers 410a and 410b of the composite may be oriented so that the carbon fibers in the top layer 410a are not aligned with the carbon fibers of the bottom layer 410b (for example, with the carbon fibers of the composite layers being out of parallel alignment with respect to each other). It may be advantageous in some contexts to have the fiber orientation of layers be out of alignment, for example to provide strength in more than one direction. In some embodiments, multiple unidirectional composite layers (with each layer having its fibers oriented unidirectionally) might be used, while other embodiments might use multiple bi-directional (or otherwise multi-directional) composite layers (with each layer having its fibers oriented in more than one direction), and/or combinations thereof.

Figure 5:
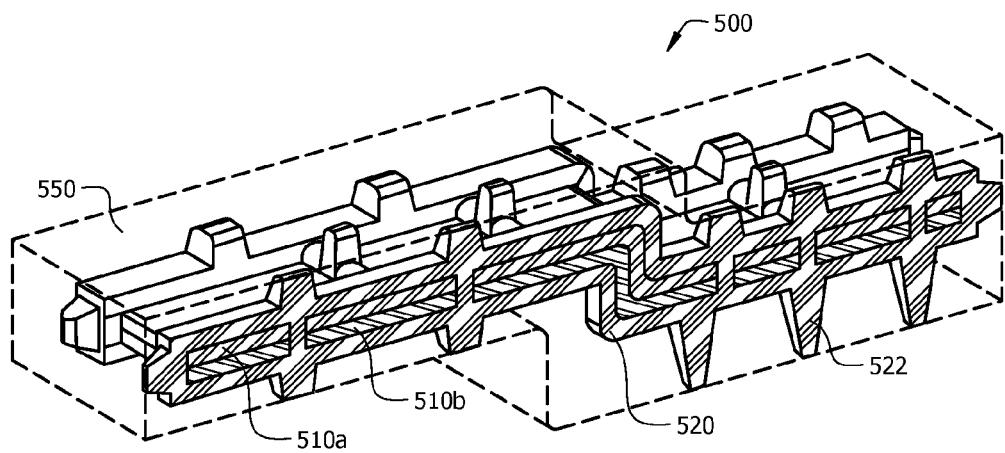
FIG. 5 is a perspective cross-sectional view of an exemplary injection molded thermoplastic element with a multi-layer composite, positioned at least partially off neutral axis.
Figure 5A:
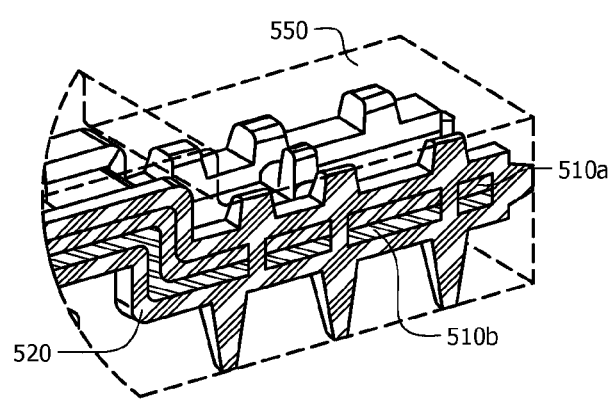
FIG. 5A is an enlarged cross-sectional view of the injection molded thermoplastic element of FIG. 5.

FIG. 5 illustrates an exemplary element 500 similar in many respects to that of FIG. 4 (i.e. having multi-layered composite 510a and 510b), but demonstrates that the composite 510 may not be positioned along the central axis of the element 500 and/or that the ITPS 520 may not be symmetrical about the composite 510. As discussed above with respect to FIG. 3, the spires 522 may be used to position the composite 510 as desired within the element 500 to provide support (typically so that the assembly of the composite 510 and the ITPS 520 may provide the minimum required structural support for the element 500). Any number of longitudinal structures and/or crossbar structures of the latticework of the ITPS 520 may be used, depending upon the requirements of the specific element 500, and the location, sizing, and/or number of the spires 522 may vary based on the external geometry of the element 500, the desired positioning of the composite within the element 500, and/or the structural support requirements of the element 500.

Figure 6:
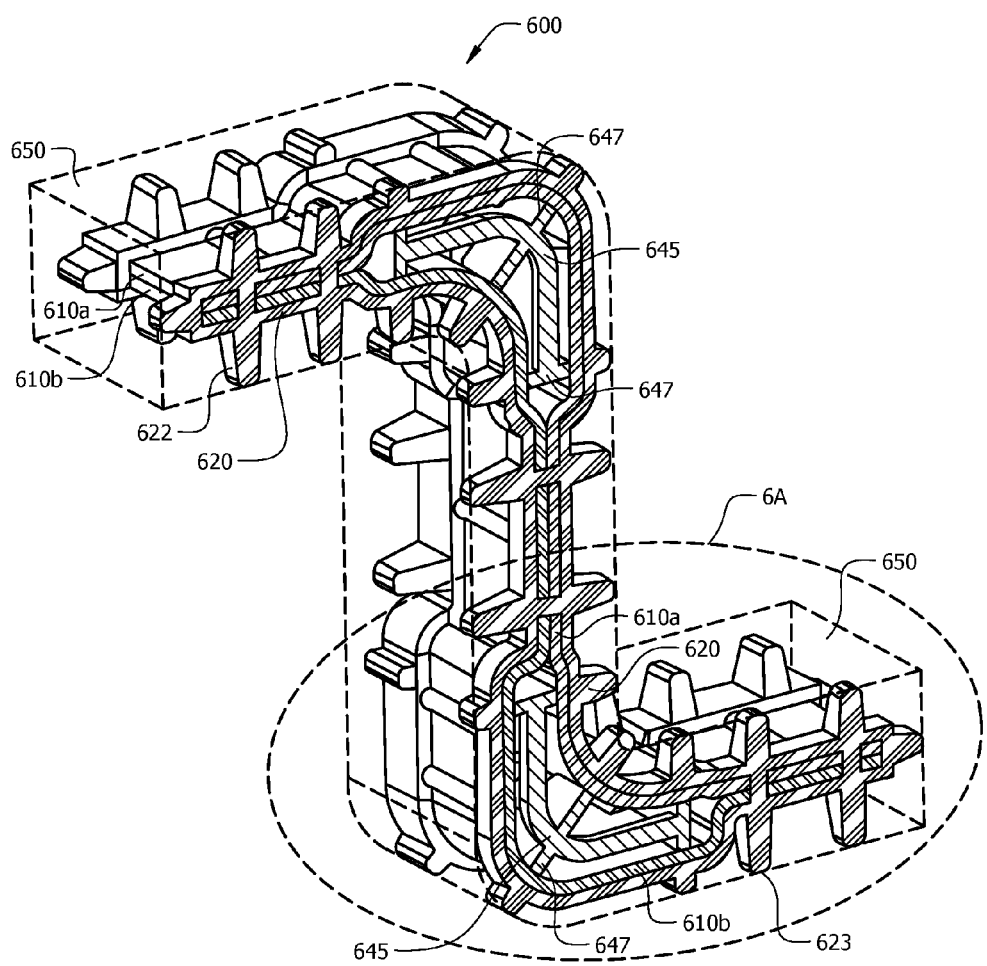
FIG. 6 is a perspective cross-sectional view of an exemplary injection molded thermoplastic element having a multilayer composite with composite support elements.
Figure 6A:
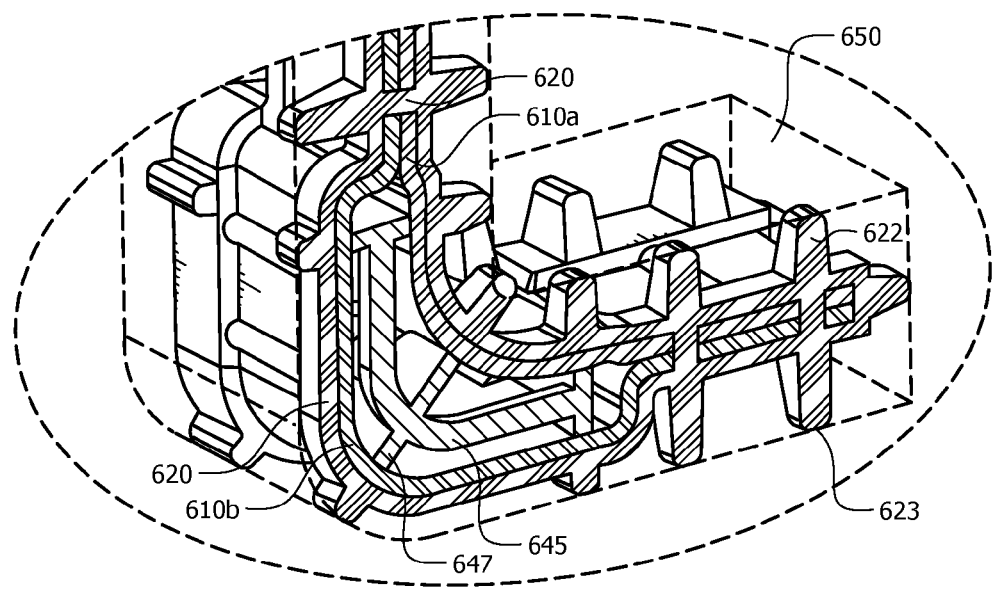
FIG. 6A is an enlarged cross-sectional view of the injection molded thermoplastic element of FIG. 6.

FIG. 6 illustrates a more complex exemplary embodiment of an element 600. The embodiment of FIG. 6 is similar to that of FIG. 4 in many ways (for example, having a multi-layered composite 610 (with layers/plies 610a and 610b), an ITPS 620 with spires 622 (each having distal end 623), and an encapsulating thermoplastic 650), but element 600 also includes one or more spacer elements 645 to assist in forming more complex shapes and/or to assist in locating the composite layers as desired within the element 600. The spacers 645 of FIG. 6 are typically located between a portion of the two composite layers 610a and 610b, such that the composite layers 610a and 610b are not adjacent or contacting along those portions. The spacers 645 of FIG. 6 typically include one or more projections 647 providing contact support to the composite layer(s) at specific locations. For example, in FIG. 6, the spacers 645 have projections 647 aligned with corresponding spires 622 on the composite-ITPS assembly 610, 620. By supporting the spires 622 accordingly, the spacers 645 may help ensure that the spires precisely position the multi-layered composite 610a and 610b within the element 600 (by for example, minimizing the risk of inward deflection during injection molding of the encapsulating thermoplastic).

Figure 7:
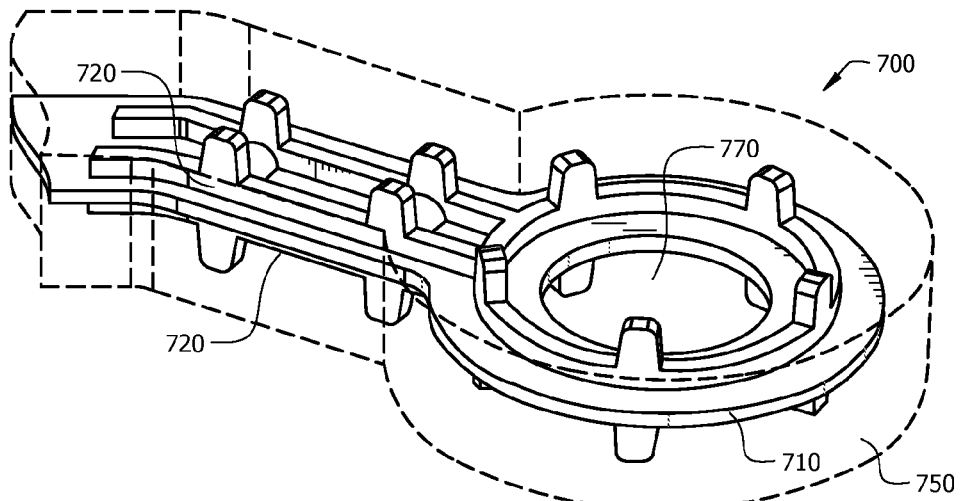
FIG. 7 is a perspective cross-sectional view of an exemplary injection molded thermoplastic element with a single layer composite with formed aperture through the element.
Figure 7A:
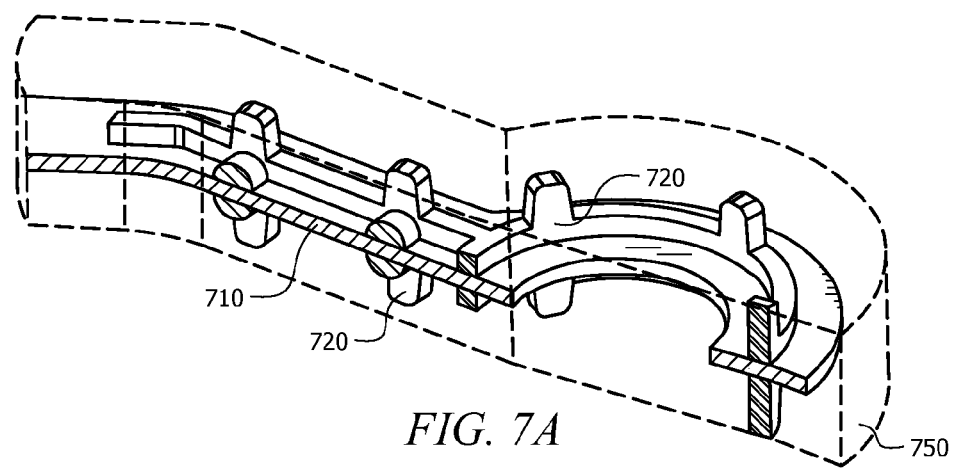
FIG. 7A is a cross-sectional view of the injection molded thermoplastic element of FIG. 7.

FIG. 7 illustrates an embodiment (similar to that of FIG. 2 in many respects) of a portion of an element 700 (having a composite 710, an ITPS 720, and an encapsulating thermoplastic 750) having an aperture 770 through the element 700. The aperture 770 may be formed in the composite 710 (typically using a blade, abrasive jet, laser, or other such means to penetrate the composite blank sheet), and the ITPS 720 may position the composite 710 within the element 700 (with the encapsulating thermoplastic 750 forming the exterior geometry of the element 700) so that the composite may provide minimum required support for the element 700 (typically in conjunction with the ITPS 720). By using the composite 710 in this manner, structural support of the element 700 about this aperture 770 may be reliable, predictably, and repeatedly achieved. More specifically, the use of composite (typically with ITPS) may allow for precise positioning of support (for example, reinforcing fibers) for the element (and specifically about and around an aperture through the element), minimizing or eliminating concerns regarding weak spots around such an aperture due to knit or meld lines, for example. In other words, the use of composite (typically with ITPS formed precisely thereon) allows for the amount and/or orientation of reinforcing fibers about/around the aperture to be precisely controlled and/or known, so that structural support may be precisely calibrated/configured based on the needs of the element. Typically, the aperture 770 would be formed in the composite 710 when the composite is already in solid form (for example, by forming a hole in the solid sheet blank), the ITPS 720 may then be formed about the aperture 770 through the composite, and the encapsulating thermoplastic 750 may then be formed over the composite and ITPS and about the aperture, resulting in precise structural support about the aperture (which penetrates through the entire element structure). In some alternative embodiments, composite might be located within encapsulating thermoplastic without the need for ITPS. Such an embodiment would still provide precision with respect to the fibers about an aperture in the element (although difficulties may arise regarding the precision of locating the composite in the encapsulating thermoplastic).

Figure 8:
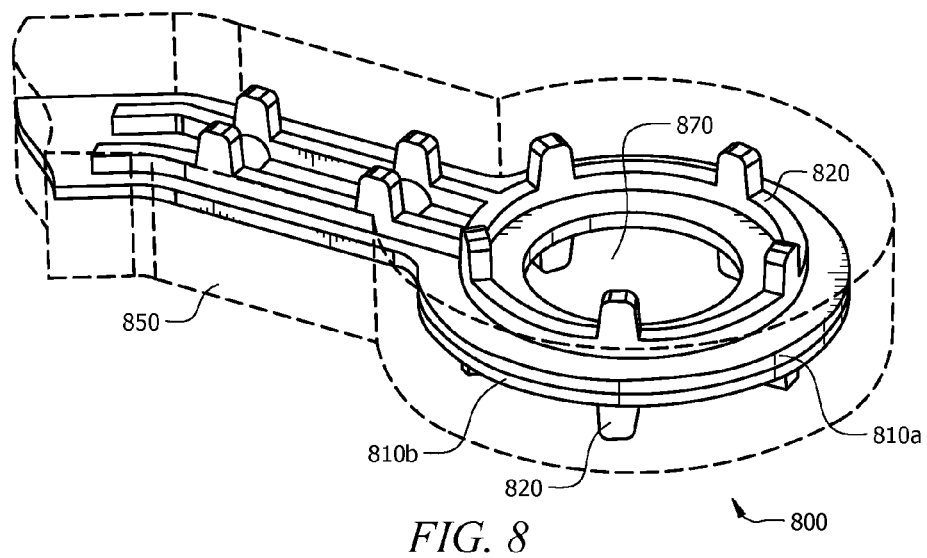
FIG. 8 is a perspective cross-sectional view of an exemplary injection molded thermoplastic element with a multi-layer composite with formed aperture through the element.
Figure 8A:
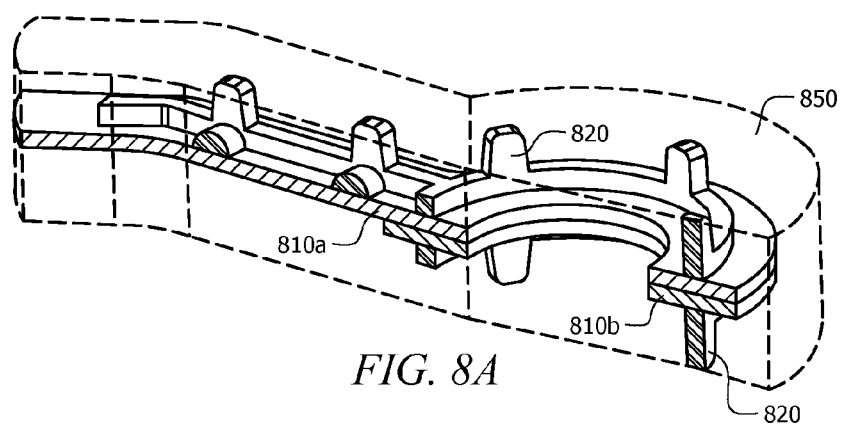
FIG. 8A is a cross-sectional view of the injection molded thermoplastic element of FIG. 8.

FIG. 8 illustrates another embodiment similar in many respects to that of FIG. 7 (i.e. an element 800 having an aperture therethrough 870 and comprising a composite 810, and ITPS 820, and an encapsulating thermoplastic 850), but the embodiment of FIG. 8 comprises a multi-layered composite having a primary (top) layer 810a and a supplemental (bottom) layer 810b providing additional structural support for at least a portion of the element 800. For example, in FIG. 8, the supplemental layer 810b is provided around the aperture 870 to further strengthen the area around the aperture (in case the primary composite 810a might be insufficient to support this area structurally alone), but does not extend to other portions of the element 800 (which receive support from the primary composite layer 810a and perhaps the ITPS). In other embodiments, the bottom layer 810b of the composite might span more, or even all, of the element, depending typically on the structural support needs of the specific element. Thus, any number of composite layers might be used to provide reinforcement to specific portions of the element.

Embodiments of elements formed as described above with respect to FIGS. 2-8 may be more compatible with low-cost, high volume manufacturing methodologies. There may be less anomalies, defects, and/or weak spot concerns, for example. Such element embodiments may be formed consistently and/or repeatably, so that First Article Inspection techniques may be acceptable (simplifying the inspection/validation process). Such element embodiments also may not suffer knit and/or meld line issues (or at least have substantially less such issues), typically providing reliable, repeatable structural support for the element. Also, such element embodiments may reduce the amount of reinforced fiber required for an element, resulting in more cost-effective high strength-to-weight ratios. Applicants hope that one or more of these advantages and/or other advantages may be provided by the disclosed embodiments, and that persons of skill may realize such advantages in at least some contexts.

Figure 9:
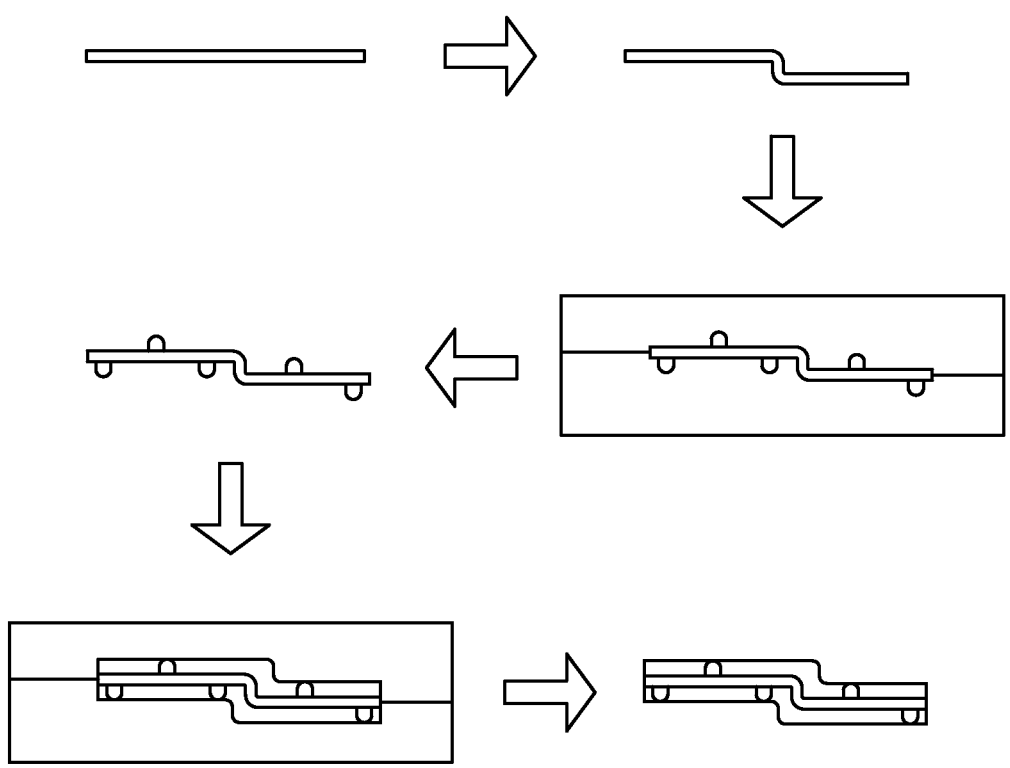
FIG. 9 illustrates schematically an exemplary method of forming an exemplary element using a composite, molded ITPS, and molded encapsulating thermoplastic.

Typical elements of the kind described above may be formed using the following exemplary method steps: providing a composite (typically comprising an array of reinforcing fibers such as carbon and/or graphite, which may be aligned in a parallel, unidirectional orientation or in a multi-directional orientation (such as a weave pattern) and disposed within a thermoplastic sheathing); shaping the composite into a shape for providing structural support for the element (as dictated by the element's support requirements); injection molding an ITPS onto the composite to form a composite-ITPS assembly; and/or injection molding an encapsulating thermoplastic onto (typically encasing or surrounding) the composite-ITPS assembly to form the exterior geometry of the element. Typically, injection molding an ITPS onto the composite may comprise placing the composite (in solid form) into a first injection molding tool (which may be configured (with a cavity shaped) to form the ITPS about the composite); injecting ITPS resin material (which typically may include thermoplastic resin with reinforcing fibers dispersed therein) into the first injection molding tool; and removing the composite-ITPS assembly from the first injection molding tool (typically once the ITPS resin material has cooled and/or solidified in place on and affixed to the composite). The composite typically might be held in position in the ITPS injection molding tool, for example clamped at a location on the composite in which the ITPS will not be formed. Similarly, injection molding encapsulating thermoplastic onto the composite-ITPS assembly typically might comprise placing the assembly into a second injection molding tool (which typically may be configured (with a cavity shaped) to form the exterior geometry of the element); injecting encapsulating thermoplastic resin material (typically thermoplastic resin with or without reinforcing fibers) into the second injection molding tool; and removing the element from the second injection molding tool (typically once the encapsulating thermoplastic has cooled and/or solidified in place about and affixed to the composite-ITPS assembly to form the element). FIG. 9 provides an illustration of an exemplary method of forming an exemplary element. Typically, the composite may be held in position in the first injection molding tool, such that at least a portion of the composite will not be covered by the ITPS (at the location(s) the composite was held, for example).

Typically, the ITPS may be configured to interact with the second injection molding tool (for example, with the distal ends of the spires of the ITPS corresponding appropriately with the dimensions of the (cavity of the) second injection molding tool to locate and hold the composite in place during injection molding of the encapsulating thermoplastic as needed for structural support of the element) to precisely position (and hold) the composite within the second injection molding tool. The ITPS and the second molding tool are typically shaped to correspond and interact effectively for secure positioning of the composite. For example, the distal ends of the spires may typically contact the inner cavity surface of the second injection molding tool with positive contact when the composite-ITPS assembly is placed in the second injection molding tool for formation of the encapsulating thermoplastic. The ITPS interaction with the second molding tool allows for precise, repeatable formation of elements, with the structural support (primarily provided by the composite-ITPS assembly) appropriately positioned therein (to meet minimum structural support requirements for the element).

The ITPS may comprise the same (chemical composition) thermoplastic material as the composite, and the encapsulating thermoplastic may comprise the same (chemical composition) thermoplastic as the ITPS and/or composite. This may allow the ITPS to be chemically fused (bonded) to the composite, and the encapsulating thermoplastic to be chemical fused (bonded) to the composite-ITPS assembly (or composite and/or ITPS), when for example the same thermoplastic material is used within thermal injection molding. Typically, this formation might result in a homogeneous connective interface between the features (the composite, the ITPS, and/or the encapsulating thermoplastic), resulting in a unified structure for the element. Of course, in other embodiments it may be possible to affix the ITPS to the composite and/or the encapsulating thermoplastic to the composite and/or ITPS using alternative joining or affixing means. Applicants typically prefer thermal injection molding, however, since this provides lower cost, improved precision, and/or better reproducibility, for example.

Typically, the composite may be shaped and/or positioned appropriately to provide structural support for the element (usually prior to addition of the ITPS and/or encapsulating thermoplastic). Thus, method of formation embodiments may comprise determining an appropriate location/position and/or shape for the composite, ITPS, and/or composite-ITPS assembly. This may be performed using predictive analysis techniques and tools (such as Finite Element Analysis, for example) and/or Mold Flow Analysis. The ITPS typically may comprise a plurality of spires projecting outward to the final geometric limit of the element (defining the exterior geometry of the element at that location). Such spires may be operable to retain the composite in location/ position during formation of the encapsulating thermoplastic. Typically, the element may have minimum structural support requirements, and the composite-ITPS assembly may provide the minimum structural support required for the element (i.e. meet minimum structural support requirements of the element, even without accounting for the encapsulating thermoplastic).

In some embodiments, the composite may be a multi-layered composite. In such instances, method embodiments might comprise providing a second composite (layer/ply); orienting the second composite (layer/ply) with respect to the first composite (layer/ply), typically so that the reinforcing fibers are not parallel; affixing/joining the second composite (layer) and the first composite (layer) to form a unified composite (which may then be shaped in some embodiments). Typically, such layers of composite might be joined homogeneously (for example, heated and cooled in contact to form a chemical bond). In some embodiments, the positioning of the multi-layered composite within the element may be more complex (to provide effective structural support, typically based on predictive analysis and/or trial and error). In such instances, one or more spacers may be used to separate and securely position the first composite layer and the second composite layer with respect to each other for at least a portion of the composite. Thus, method embodiment may comprise positioning a spacer between the first composite (layer) and the second composite (layer), for at least a portion of the dimensions of the composite layers, prior to joining the composites into an integral whole. Typically, the spacer(s) may comprise one or more (and typically a plurality of) projections oriented to align with the spires on the composite-ITPS assembly for the corresponding area.

Often, it may be desirable to form a plurality of apertures in the composite (for example, to aid in flow of ITPS resin during injection molding of the ITPS and/or to provide for mechanical interference locking of the ITPS to the composite to further strengthen the attachment therebetween). Thus method embodiments may include forming a plurality of apertures in the composite, wherein injection molding the ITPS onto the composite may form a plurality of penetration elements corresponding to the plurality of apertures in the composite. And in some embodiments, the element itself may have an aperture therethrough. In such embodiments, the aperture may be formed in the composite, the ITPS may be formed with portions about the aperture, and the encapsulating thermoplastic may be formed onto the composite and/or ITPS about the aperture (so that the aperture passes through the element and has precisely positioned structural support about the entire aperture, without for example concern regarding weak sports of the sort that might be formed by knit or meld lines).

Typical embodiments of the composite may comprise a top surface and a bottom surface, with the ITPS comprising a plurality of spires projecting distally from the top surface and a plurality of spires projecting distally from the bottom surface. The distal ends of the spires typically may extend to the final geometric limit of the element (allowing the plurality of spires to precisely position the composite within the element and/or the second injection molding tool to provide structural support). In some embodiments in which the composite comprises a top surface and a bottom surface, the ITPS may comprise a latticework on the top surface having spires extending therefrom, a latticework on the bottom surface having spires extending therefrom, and the plurality of penetrations joining/linking the top and bottom latticeworks into a single integrated whole.

Figure 10:
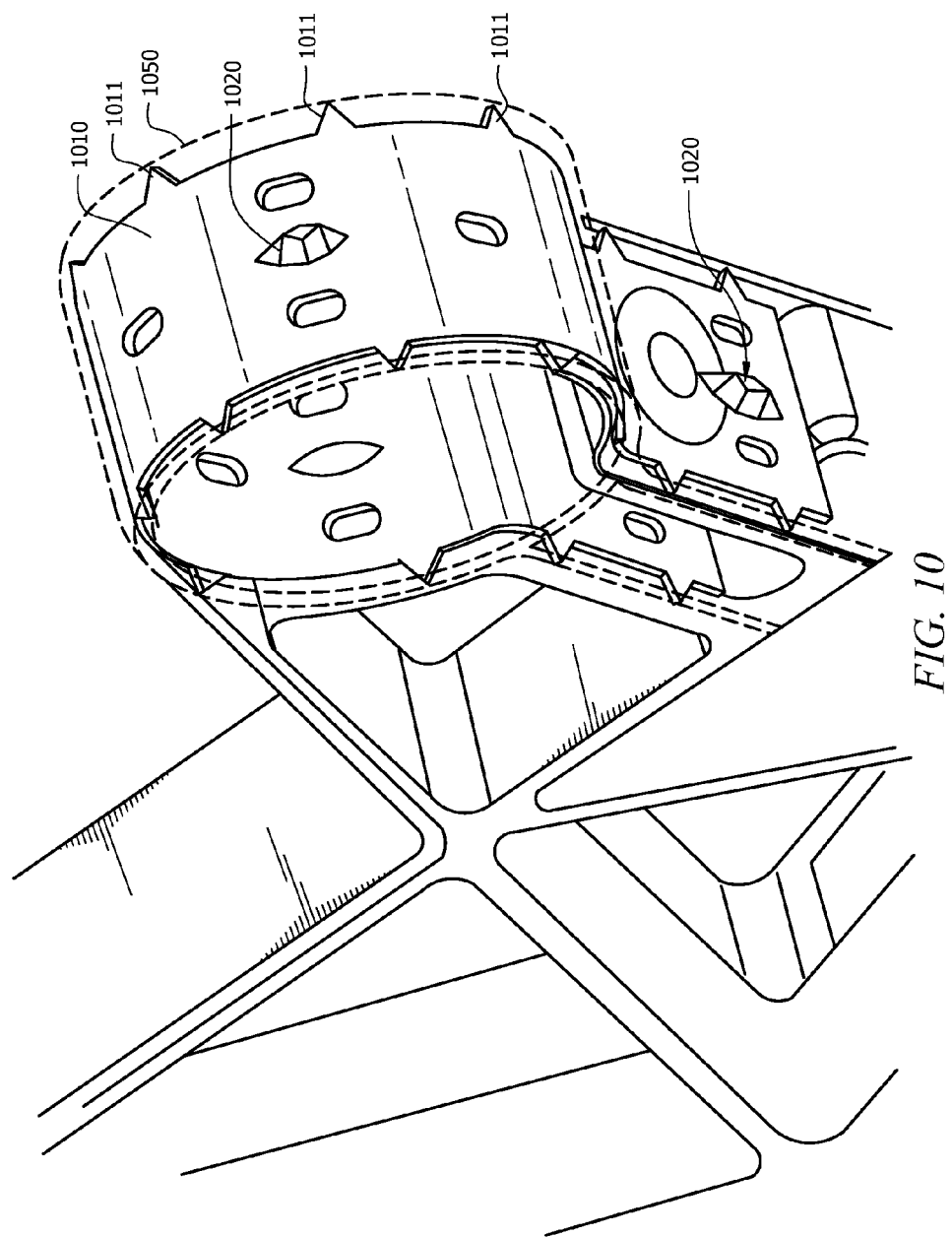
FIG. 10 illustrates a partial perspective view of an exemplary element having integral spires formed in the composite material.

While formation of the ITPS onto the composite and/or formation of the encapsulating thermoplastic about the composite-ITPS assembly have been generally described in terms of injection molding, in alternative embodiments either or both might be formed using other processes resulting in an element with structure as described herein. So for example, other forms of molding might be used; or the ITPS might be formed on the composite using some alternative means (such as direct depositing material onto the composite at precise locations to build up the ITPS or depositing a layer of material onto the composite and then etching away unwanted portions to provide the ITPS), with the assembly then being positioned in a mold for formation of the encapsulating thermoplastic. Alternatively, in some embodiments some or all of the positioning spires (of the type described above with respect to ITPS) may be formed by machining the composite material 1010 itself. FIG. 10, for example, shows an exemplary element having ITPS spires 1020 formed on a surface of the composite 1010 for the element, and also having the composite 1010 machined to have integral spires 1011 on another surface of the composite material 1010. While the spires 1011 shown in FIG. 10 may be cut into a surface of the composite, in other embodiments spires might alternatively be formed by reconfiguring the thermoplastic of the composite material, for example by melting and reforming the thermoplastic of the composite. In some embodiments, formation of integral spires might eliminate the need for a separate ITPS in some embodiments, by allowing spires formed on the composite to position the composite within the encapsulating thermoplastic 1050. In some embodiments, integral spires might be used in place of ITPS, with such embodiments having only composite with integral spires and encapsulating thermoplastic (e.g. no ITPS). In some embodiments, formation of integral spires on the composite material might be accomplished via CNC machining, abrasive water cutting, die cutting, or any other method that provides penetration through the composite material resulting in geometric forming of integral spires within the composite.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

What is claimed is:

1. A thermoplastic injection molded element comprising:
a composite comprising an array of parallel carbon fibers disposed in a thermoplastic material;
an ITPS configured to position the composite within the element during formation;
and an encapsulating thermoplastic forming an exterior geometry of the element;
wherein:
the composite comprises an outer surface, the outer surface of the composite comprises a top surface and a bottom surface, and the ITPS is located on and affixed to at least a portion of the top and bottom surfaces of the composite to form a composite-ITPS assembly;
the top surface of said composite is attached to an ITPS which comprises a first set of longitudinal structures joined in a perpendicular configuration by crossbar structures disposed inwardly of respective ends of the longitudinal structures, and wherein the bottom surface of said composite is attached to an ITPS which comprises a second set of longitudinal structures joined in a perpendicular configuration by crossbar structures disposed inwardly of respective ends of the longitudinal structures, and wherein the first set of longitudinal structures is above said second set of longitudinal structures;
the composite-ITPS assembly provides minimum required structural support for the element;
the encapsulating thermoplastic is located about and affixed to the composite-ITPS assembly;
the ITPS and the encapsulating thermoplastic each comprise thermoplastic material, and the composite, ITPS, and encapsulating thermoplastic each comprise the same thermoplastic material;
the thermoplastic material comprises one of the following: polycarbonate, polyphenylene sulfide, polyetherimide, and combinations thereof;
the composite comprises a plurality of apertures therethrough, and wherein the plurality of apertures are perpendicular to said longitudinal structures;
the ITPS comprises a plurality of penetration elements that extend through the apertures in the composite and a plurality of spires extending distally to a final geometric limit of the element;
the composite-ITPS assembly is formed by injection molding;
the encapsulating thermoplastic is formed about the composite-ITPS assembly using injection molding; and
the composite, ITPS, and encapsulating thermoplastic are affixed via chemical fusing during injection molding.

2. The element of claim 1 wherein the composite is multi-layered.

3. The element of claim 1 further comprising an aperture through the element, wherein the composite and ITPS are precisely positioned about the aperture to provide structural support about the aperture to minimize concerns regarding weak spots about the aperture.

4. An element comprising:
a composite comprising an array of reinforcing fibers disposed in a thermoplastic material;
an ITPS configured to position the composite within the element during formation; and an encapsulating thermoplastic forming an exterior geometry of the element, the ITPS comprising a first set of longitudinal structures and a second set of longitudinal structures each joined in a perpendicular configuration by crossbar structures disposed inwardly of respective ends of the longitudinal structures and wherein the first set of longitudinal structures is above said second set of longitudinal structures;
the composite comprises a plurality of apertures therethrough; and
the ITPS comprises a plurality of penetration elements that extend through the apertures in the composite and a plurality of spires extending distally to a final geometric limit of the element.

5. The element of claim 4 wherein the composite comprises an outer surface and the ITPS is located on and affixed to at least a portion of the outer surface of the composite to form a composite-ITPS assembly.

6. The element of claim 5 wherein the encapsulating thermoplastic is located about and affixed to the composite-ITPS assembly.

7. The element of claim 4 wherein the ITPS and the encapsulating thermoplastic each comprise a thermoplastic material, and the composite, ITPS, and encapsulating thermoplastic each comprise the same thermoplastic material.

8. The element of claim 7 wherein the thermoplastic material comprises one of the following: polycarbonate, polyphenylene sulfide, polyetherimide, and combinations thereof.

9. The element of claim 6 wherein the composite, ITPS, and encapsulating thermoplastic are affixed via chemical fusing.

10. The element of claim 5 wherein the composite-ITPS assembly provides the minimum required structural support for the element.

11. The element of claim 4 wherein the ITPS comprises a plurality of spires, and the spires each comprise a distal end, wherein the distal ends of the plurality of spires extend to the final geometric limit of the element.

12. The element of claim 11 wherein the plurality of spires each narrow as they extend distally.

13. The element of claim 4 wherein the ITPS comprises a plurality of spires projecting distally to the final geometric limit of the element; and wherein the plurality of spires of the ITPS are aligned with the plurality of apertures in the composite.

14. The element of claim 6 wherein the composite-ITPS assembly is formed by injection molding, and the encapsulating thermoplastic is formed about the composite-ITPS assembly using injection molding.

15. The element of claim 4 wherein the composite is multi-layered.

16. The element of claim 15 wherein the multi-layered composite further comprises a spacer located between a portion of the two layers of composite.

17. The element of claim 16 wherein the ITPS comprises a plurality of spires projecting distally to the final geometric limit of the element; and wherein the spacer comprises a plurality of projections aligned with corresponding spires on an assembly of the composite and the ITPS, the spacer comprises a thermoplastic material, and the thermoplastic material of the spacer is the same as that of the composite.

\* \* \* \* \*